(12) United States Patent
Osann, Jr.

(10) Patent No.: US 8,502,790 B2
(45) Date of Patent: Aug. 6, 2013

(54) TOUCHPAD WITH REVERSE-MOUNTED BUTTONS

(76) Inventor: Robert Osann, Jr., Morgan Hill, CA (US)

( * ) Notice: Subject to any disclaimer, the term of this patent is extended or adjusted under 35 U.S.C. 154(b) by 351 days.

(21) Appl. No.: 12/750,573

(22) Filed: Mar. 30, 2010

(65) Prior Publication Data
US 2011/0242004 A1 Oct. 6, 2011

(51) Int. Cl.
*G06F 3/041* (2006.01)
*G09G 5/00* (2006.01)

(52) U.S. Cl.
USPC .......................................... 345/173; 345/156

(58) Field of Classification Search
USPC .................................................. 345/156–184
See application file for complete search history.

(56) References Cited

U.S. PATENT DOCUMENTS

| | | | | |
|---|---|---|---|---|
| 5,856,822 A * | 1/1999 | Du et al. | | 345/73 |
| 6,591,001 B1 * | 7/2003 | Oda et al. | | 382/117 |
| 7,659,888 B2 | 2/2010 | Kyouzuka et al. | | |
| 2002/0034964 A1 * | 3/2002 | Bannai et al. | | 455/556 |
| 2004/0049743 A1 * | 3/2004 | Bogward | | 715/531 |
| 2004/0263484 A1 * | 12/2004 | Mantysalo et al. | | 345/173 |
| 2005/0116936 A1 * | 6/2005 | Chen | | 345/173 |
| 2006/0133881 A1 * | 6/2006 | Osburn et al. | | 400/489 |
| 2008/0270665 A1 * | 10/2008 | Senatori et al. | | 710/303 |
| 2008/0316176 A1 * | 12/2008 | Deutsch et al. | | 345/168 |
| 2009/0213081 A1 * | 8/2009 | Case, Jr. | | 345/173 |
| 2009/0250515 A1 * | 10/2009 | Todd et al. | | 235/383 |
| 2009/0295733 A1 * | 12/2009 | Stenbroten | | 345/168 |
| 2010/0207909 A1 * | 8/2010 | Wu et al. | | 345/175 |
| 2010/0227642 A1 * | 9/2010 | Kim et al. | | 455/556.1 |
| 2010/0277859 A1 * | 11/2010 | Wang et al. | | 361/679.21 |

\* cited by examiner

*Primary Examiner* — Alexander S Beck
*Assistant Examiner* — Nguyen H Truong (57) ABSTRACT

An assembly for attachment to a portable computer is described including a touchpad and associated buttons where the touchpad is mounted on one surface of the assembly and the associated "mouse" buttons are mounted on the reverse surface, the two surfaces facing in substantially opposite directions. The buttons are mounted in close proximity to the reverse-mounted touchpad such that the user can operate both the touchpad and the buttons simultaneously with the thumb and one or more fingers of the same hand. In one embodiment, the touchpad faces away from the user and is operated by a finger that is not the user's thumb. In another embodiment, the touchpad faces the user and is operated by the user's thumb. For all embodiments, the associated "mouse buttons" are mounted facing in the reverse direction relative to the touchpad.

4 Claims, 8 Drawing Sheets

Operation of Reverse Touchpad and Associated Buttons

Top View

TOUCHPAD WITH REVERSE-MOUNTED BUTTONS

CROSS REFERENCE

This application is related to U.S. patent application Ser. No. 12/750,553 filed Mar. 30, 2010 and entitled "REVERSE TOUCHPAD FOR PORTABLE COMPUTERS" by inventor Robert Osann, Jr.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to input devices used for control of computers and in particular touchpad cursor position controls and the buttons that normally are associated with cursor control—in traditional terms, "mouse buttons".

BACKGROUND

The primary problem solved by the present invention shows up most readily when using a laptop computer on an airplane, especially if the user's arms are relatively long. The location of a conventional touchpad on laptop computers today places it in the center of the keyboard closest to the user. Thus, when using the touchpad, the users arms stick out to the side and their elbows interfere with their neighbors in adjacent seats. This is especially apparent when the space (legroom) in front of the user is minimal, and even more so when the person sitting in the seat in front of the user reclines their seat, further restricting the space in front of the user and causing them to attempt using their computer with it pressed against their stomach. Also, some users may find it more comfortable and/or natural to use a touchpad with their arm extended.

SUMMARY

By attaching a separate module or assembly to a laptop computer that contains a touchpad on one side of the assembly and associated "mouse buttons" on the reverse side of the assembly, the user can operate the cursor controls with their arm extended forward rather than having their elbows sticking out to the sides or contorting their arms in an uncomfortable manner to avoid disturbing their neighbors in adjacent seats when riding as a passenger on an airplane or other conveyance. Such enhancements will make a laptop computer considerably more "airplane-friendly", or in general, "travel-friendly" when a user is faced with operating a laptop computer in a confined space.

In one embodiment of the instant invention, the cursor control interfaces or input devices are implemented such that the touchpad is located on the reverse side of the module or assembly, and the "mouse buttons" are located on the front side of the module and opposite the touchpad, these directions viewed from the perspective of the user. In an alternate embodiment of the instant invention, the touchpad is located on the front side of the module or assembly, and the associated "mouse buttons" are located on the back side of the module or assembly, opposite the touchpad. Either way, the user can operate the cursor controls with one or more fingers used to operate the control interface on one side of the module, and the thumb of the same hand used to simultaneously operate the control interface on the reverse side of the module. The assembly containing the touchpad and associated buttons may be mounted on an assembly designed to clip-on to the left or right side edge of the display panel. Such an assembly may also clip on to the base of the laptop, or alternately it may be plugged into a communications port on the base of the laptop such as a USB port.

Power for such an assembly can be supplied from a cable connecting to the laptop, from an included battery, or from a powered communications port such as USB. Communications for the assembly can be through a cable, a port such as USB, or a wireless interface such as Bluetooth.

DETAILED DESCRIPTION OF THE INVENTION

Figure 1:
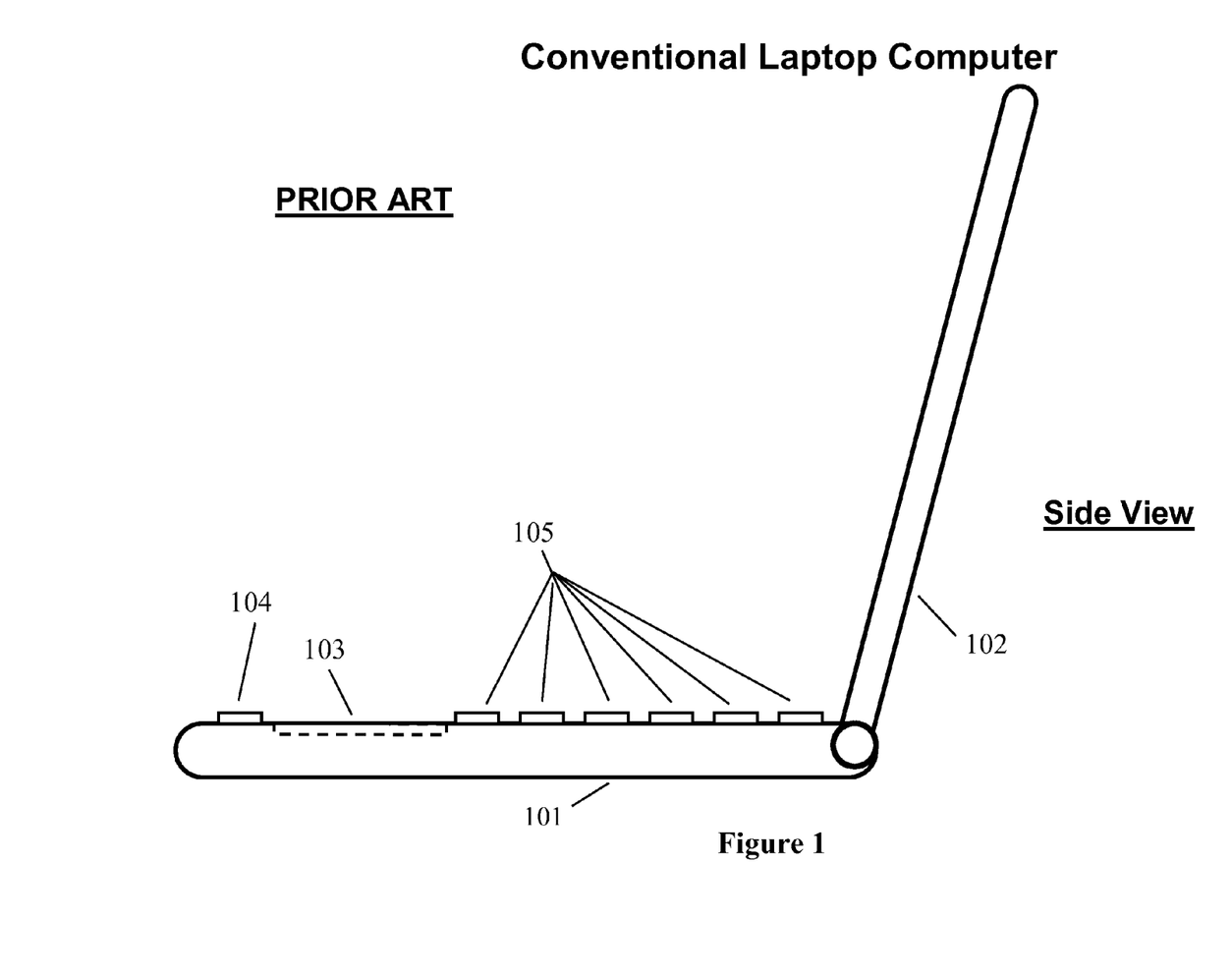
FIG. 1 shows a side-view of a prior art laptop computer.

FIG. 1 shows a prior art laptop computer including the base unit 101 and display panel 102, this laptop computer having a conventional keyboard and touchpad configuration where touchpad 103 and associated "mouse" buttons 104 are located nearest the user and the usual keyboard array 105 is located conventionally, and farther from the user.

Figure 2:
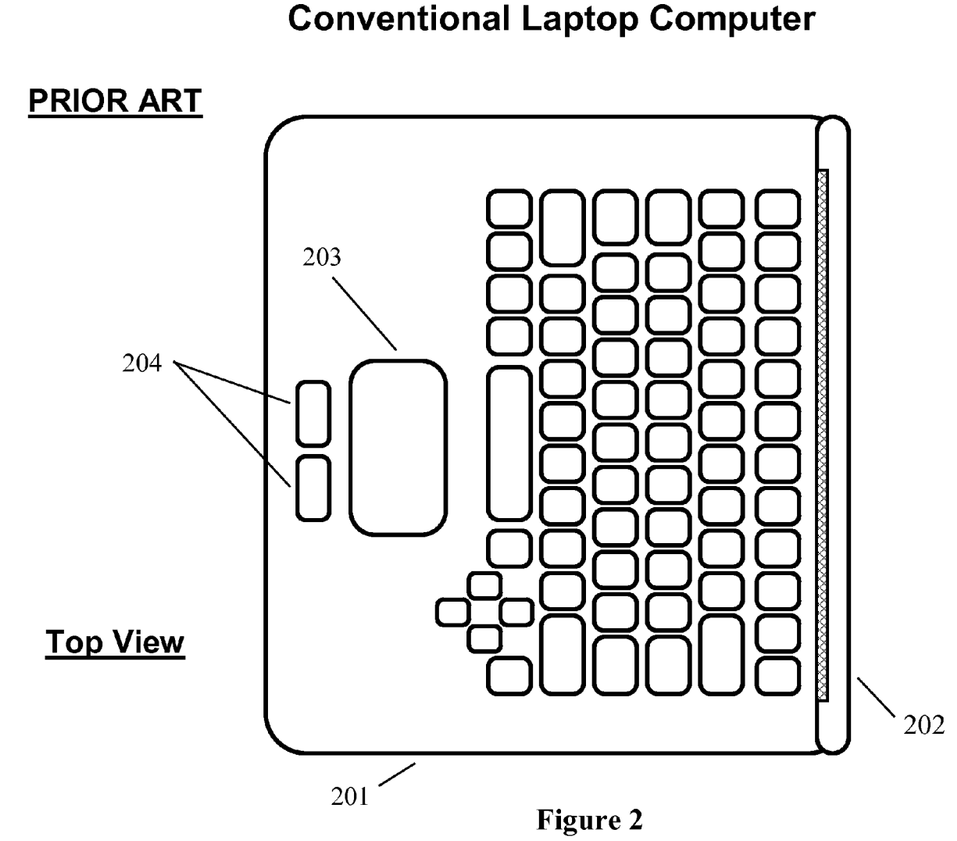
FIG. 2 shows a top-view of a prior art laptop computer.

FIG. 2 shows a top view of a prior art laptop computer including base unit 201 and display panel 202. Touchpad 203 is placed conventionally between the standard keyboard and the user along with associated "mouse buttons" 204.

Figure 3:
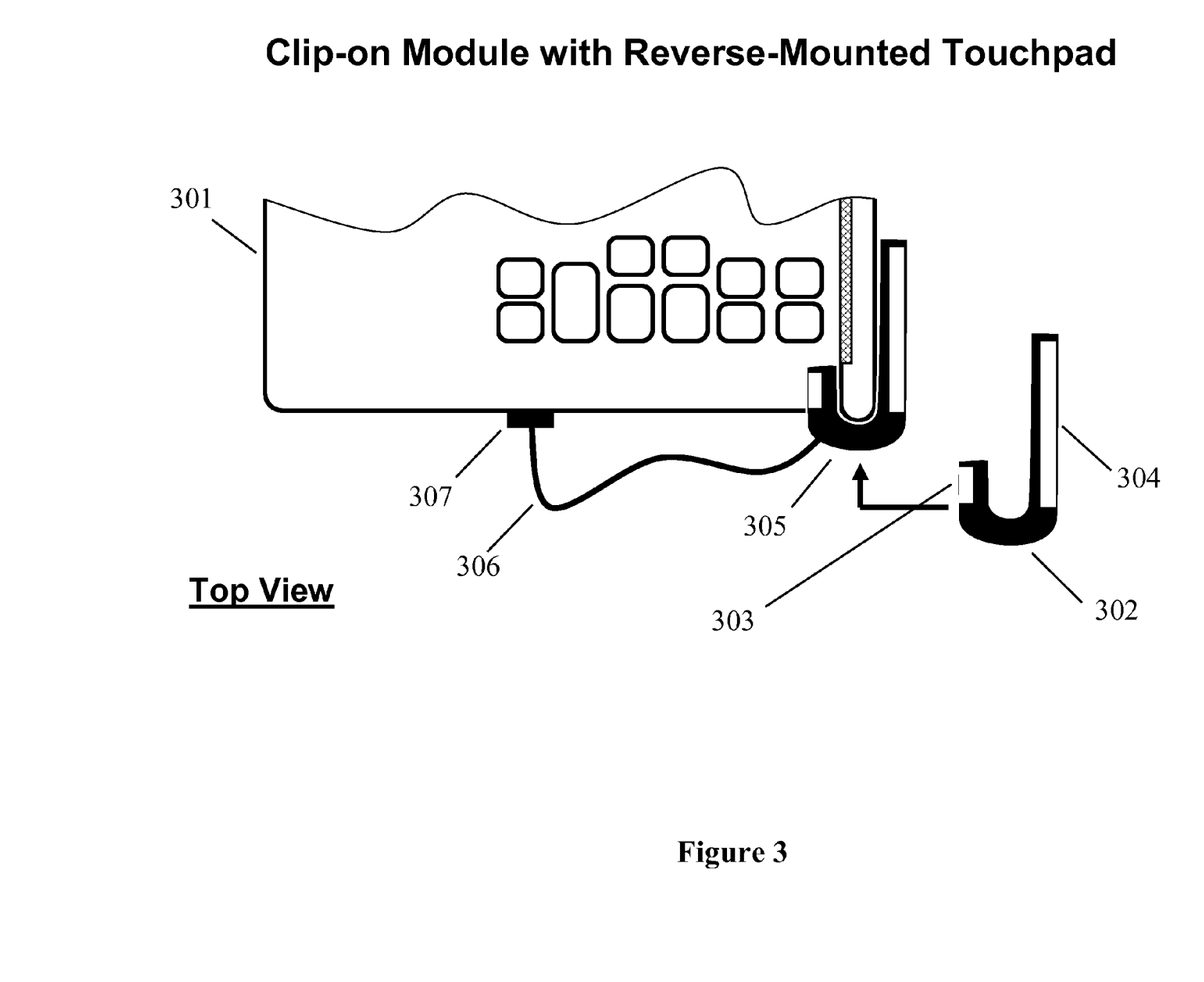
FIG. 3 shows an assembly containing a reverse-mounted touchpad and associated button(s) that is designed to clip onto the edge of the display panel of a portable computer.

FIG. 3 shows one embodiment of the present invention where reverse-mounted touchpad 304 and associated buttons 303 are incorporated into assembly 302 that is designed to clip onto the display panel of laptop computer 301, thereby assuming position 305. Once thus attached, cable 306 connects to a communication port 307 on computer 301 that also may supply power to the touchpad as required. The most common form of such a communications port interface today would be a USB port. Also, clip-on assembly 302 may communicate with laptop computer 301 via a wireless interface such as Bluetooth, and may alternately be powered, if necessary, by a battery contained in assembly 302. This clip-on assembly can be designed such that it attaches to most laptop computers and adds the convenience of a reverse-mounted touchpad which is especially useful when flying as a passenger on an airplane or other conveyance. The functions of the particular buttons can be programmed in software such that they suit the preferences of a particular user and such programmability also allows for the assembly to be attached at either the left or right side of the display panel of a laptop in order to accommodate either left or right-handed users.

Figure 4:
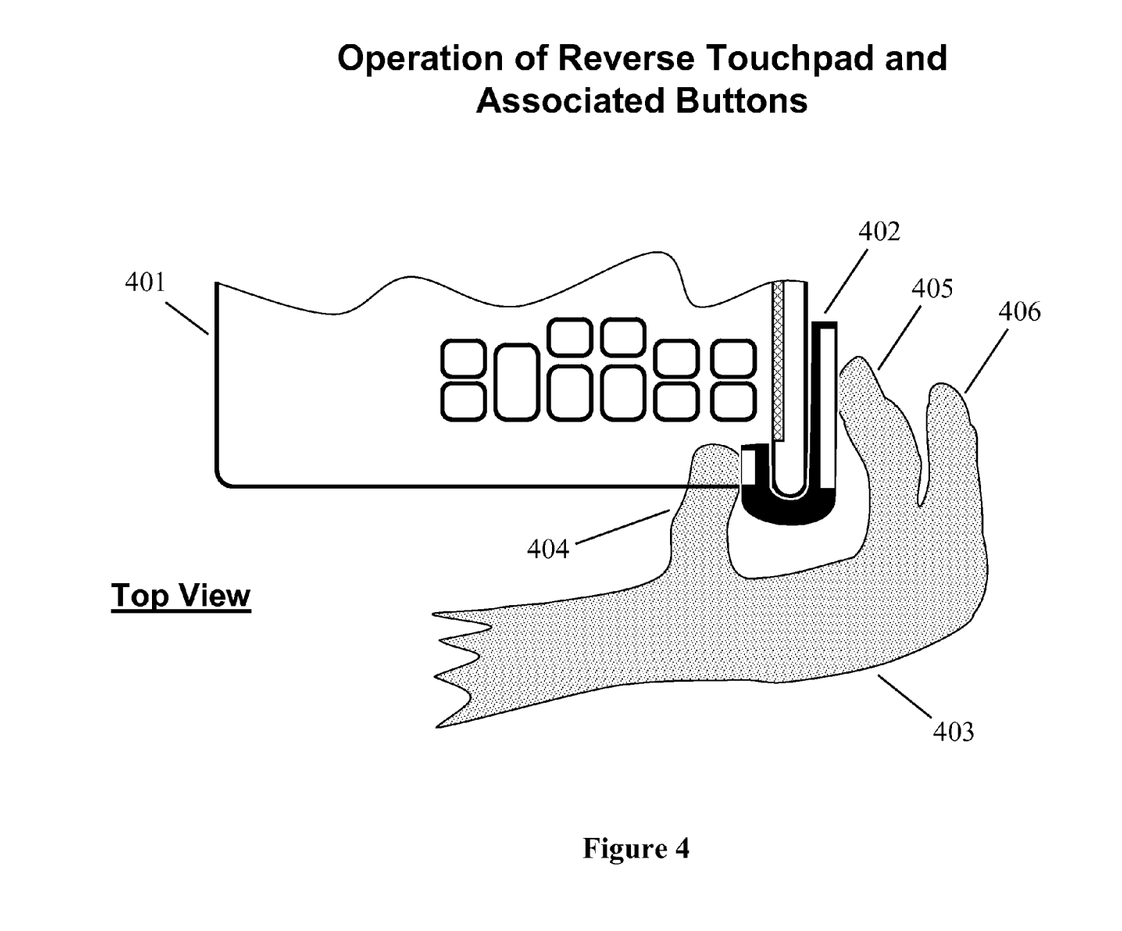
FIG. 4 shows how a reverse-mounted touchpad and associated button(s) according to the present invention are operated with the thumb and a finger of the same hand.

FIG. 4 shows how a reverse-mounted touchpad and associated buttons according to the present invention may be operated simultaneously with the fingers of a single hand. Here, a portion of laptop 401 is shown with clip-on assembly 402 including a reverse-mounted touchpad and associated buttons installed at the right-hand side of the laptop's display panel. As shown in FIG. 4, the user may simultaneously operate the reverse-mounted touchpad and buttons with the thumb and fingers of a single hand 403. For the configuration shown where the "mouse buttons" face toward the user, the buttons will typically be operated with the user's thumb 404 while the touchpad is most readily operated with the user's middle finger 405 or possibly the index finger 406 depending on the preference of the individual user.

As a general method for operating the cursor controls of a portable computer according to the present invention, for embodiments where the touchpad is mounted on the side of the assembly facing away from the user, the user would reach behind the assembly equipped with a reverse-mounted touchpad and associated buttons, and then operate the touchpad with one of their fingers, not including their thumb. Then, they would simultaneously use the thumb of the same hand to operate an associated button on the front side of the computer's display panel. The coordination of movement of the user's finger on the reverse touchpad with that of the cursor on a computer's display would typically be such that movement directions are equivalent. For instance as judged from the user's perspective, even though their finger on the touchpad is on the reverse side of the display screen, if the finger moves upward and to the left, the cursor displayed on the computer's display screen would also move upward and to the left.

For embodiments where the touchpad is mounted on the side of the assembly facing toward the user with the associated buttons mounted on the reverse side and facing away, the user can simultaneously operate the touchpad with their thumb and the associated buttons with one or more of their fingers, not including their thumb.

Figure 5:
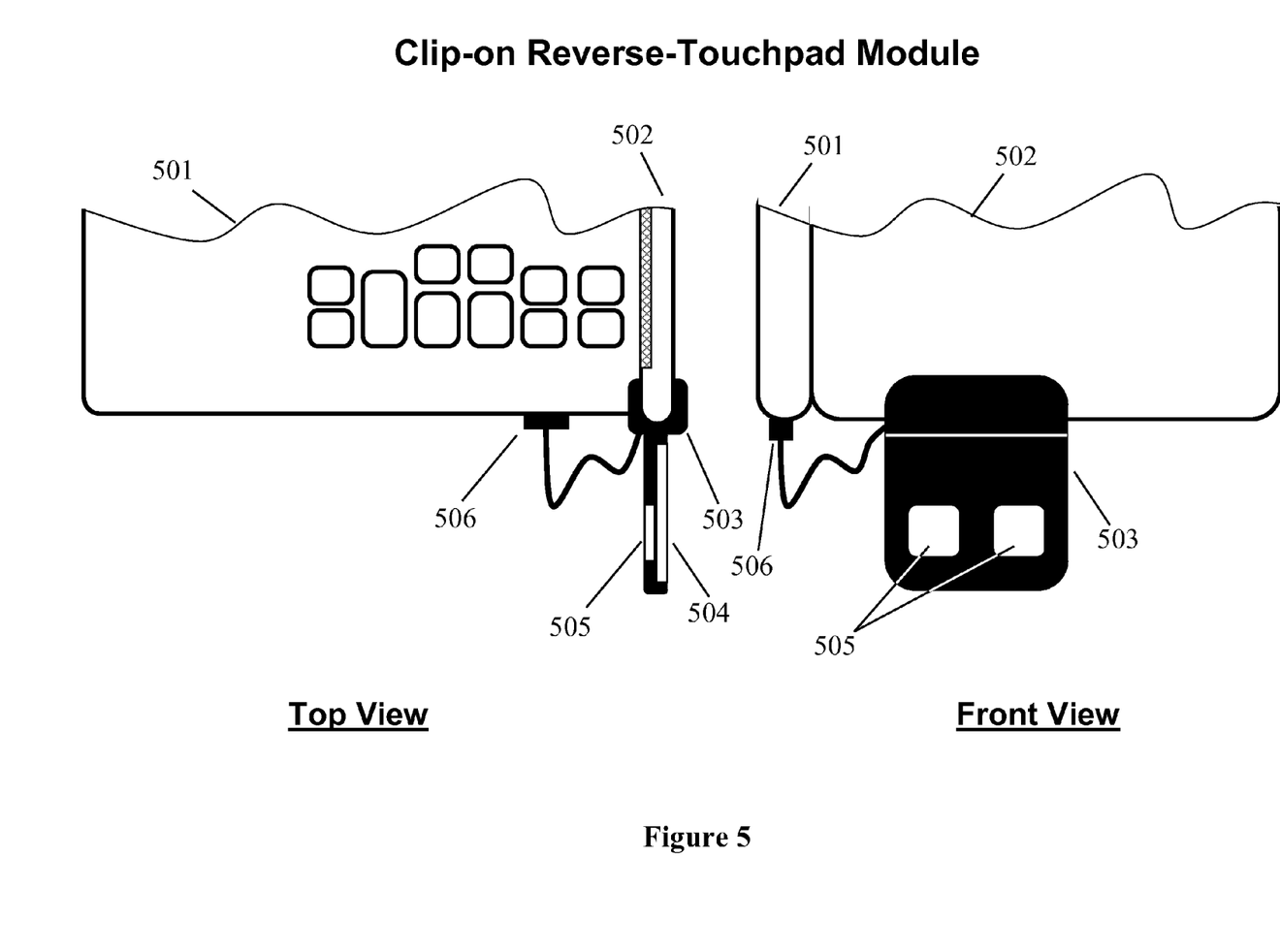
FIG. 5 shows a top view and front view of an assembly that clips onto the display panel of a laptop computer and extends out to the side. The touchpad is mounted on the side of the assembly facing away from the user while the associated buttons are mounted on the side facing toward the user.

FIG. 5 shows a portion of the base unit 501 of a typical laptop computer and display panel 502 of the laptop computer, where a separate cursor control assembly 503 has been attached to display panel 502 such that at least a portion, and in this instance the entire touchpad 504, is to the right of the outside edge of display panel 502. Assembly 503 contains touchpad 504 facing in a direction away from the user and associated buttons 505 facing toward the user. Assembly 503 is shown connected via a cable to communication port 506 on base 501 of the laptop computer which may also supply power to assembly 503. In this configuration buttons 505 would typically be operated with the user's thumb and touchpad 504 would typically be operated with the user's middle or index finger. Assembly 503 may also communicate with the laptop computer by way of a wireless interface such as Bluetooth. Power for assembly 503 may alternately be supplied by a battery internal to the assembly.

Figure 6:
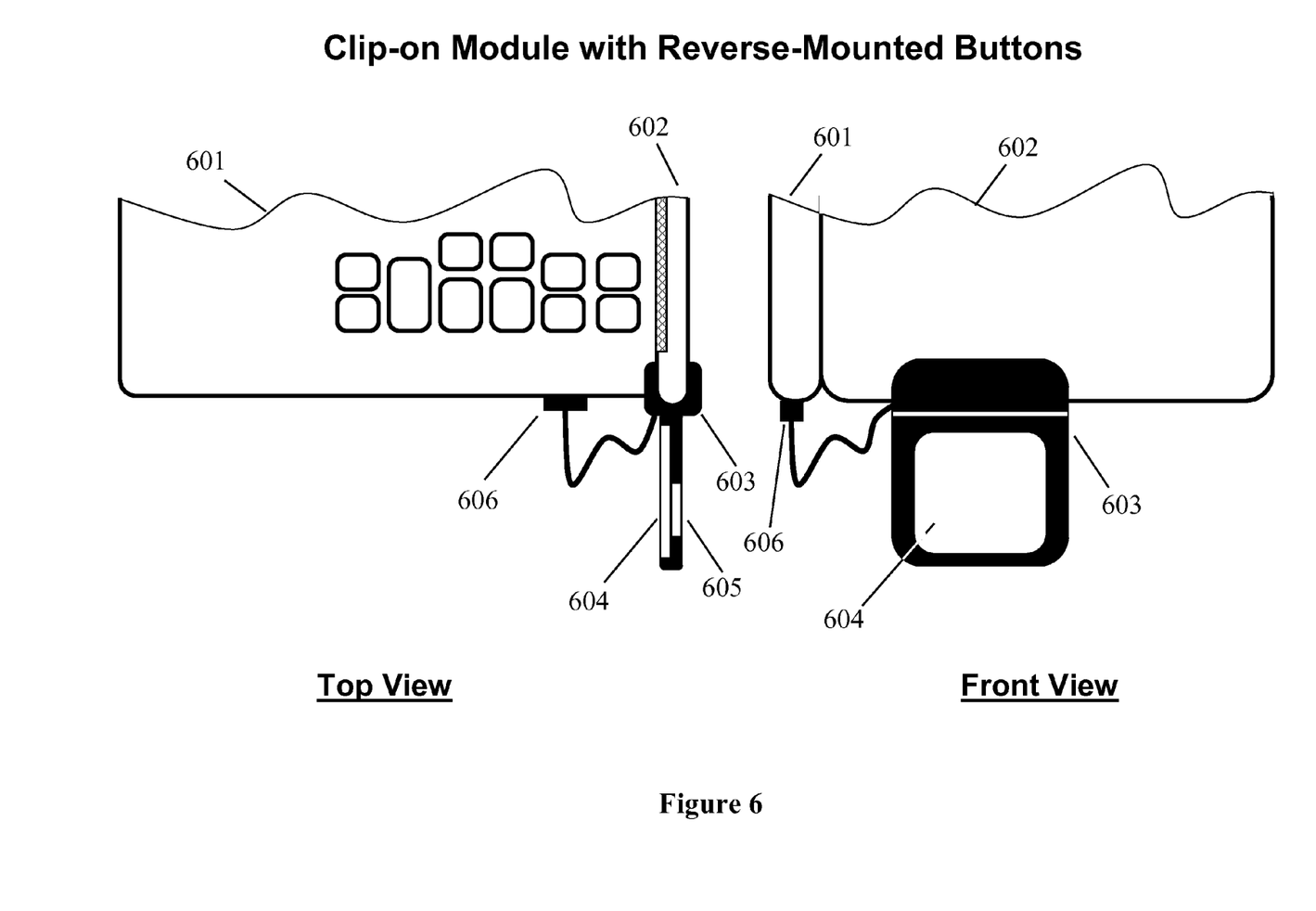
FIG. 6 shows a top view and front view of an assembly that clips onto the display panel of a laptop computer and extends out to the side. The touchpad is mounted on the side of the assembly facing toward the user while the associated buttons are mounted on the side facing away from the user.

FIG. 6 shows a portion of the base unit 601 of a typical laptop computer and display panel 602 of the laptop computer, where a separate cursor control assembly 603 has been attached to display panel 602 such that at least a portion, and in this instance the entire touchpad 604, is to the right of the outside edge of display panel 602. Assembly 603 contains touchpad 604 facing in a direction toward the user and associated buttons 605 facing away from the user. Assembly 603 is shown connected via a cable to communication port 606 on base 601 of the laptop computer which may also supply power to assembly 603. In this configuration, touchpad 604 would typically be operated with the user's thumb and buttons 605 would be operated with one or more of the user's fingers, not including their thumb. Assembly 603 may also communicate with the laptop computer by way of a wireless interface such as Bluetooth. Power for assembly 603 may alternately be supplied by a battery internal to the assembly.

Figure 7:
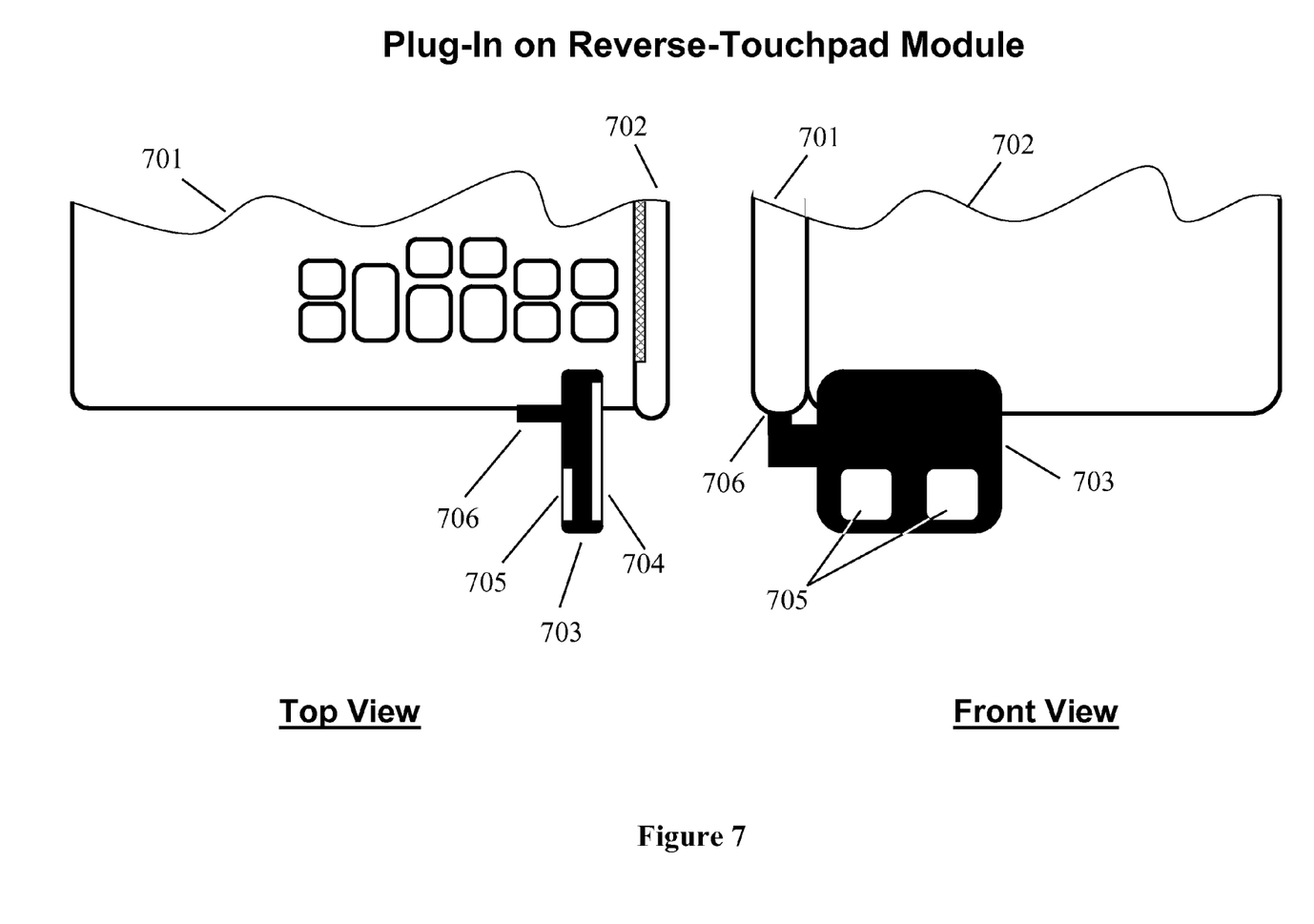
FIG. 7 shows a top view and front view of an assembly that mounts by plugging into a connector on a laptop computer. Here, the touchpad is mounted on the side of the assembly facing away from the user while the associated buttons are mounted on the side facing toward the user.

FIG. 7 shows a portion of the base unit 701 of a typical laptop computer and display panel 702 of the laptop computer, where a separate cursor control assembly 703 has been attached to base unit 701 of the laptop computer. Assembly 703 contains touchpad 704 facing in a direction away from the user and associated buttons 705 facing toward the user. Assembly 703 mounts directly to port 706 on base 701 of the laptop computer which may also supply power to assembly 703. Assembly 703 may be designed such that at least a portion of touchpad 704 extends to the right of the outside edge of base unit 701. If port 706 is a communications port such as USB, assembly 703 may receive power from port 706 and also communicate with the laptop computer via port 706. In this configuration, buttons 705 would typically be operated with the user's thumb and touchpad 504 would typically be operated with the user's middle or index finger. Assembly 503 may also communicate with the laptop computer by way of a wireless interface such as Bluetooth. Power for assembly 503 may alternately be supplied by a battery internal to the assembly.

Figure 8:
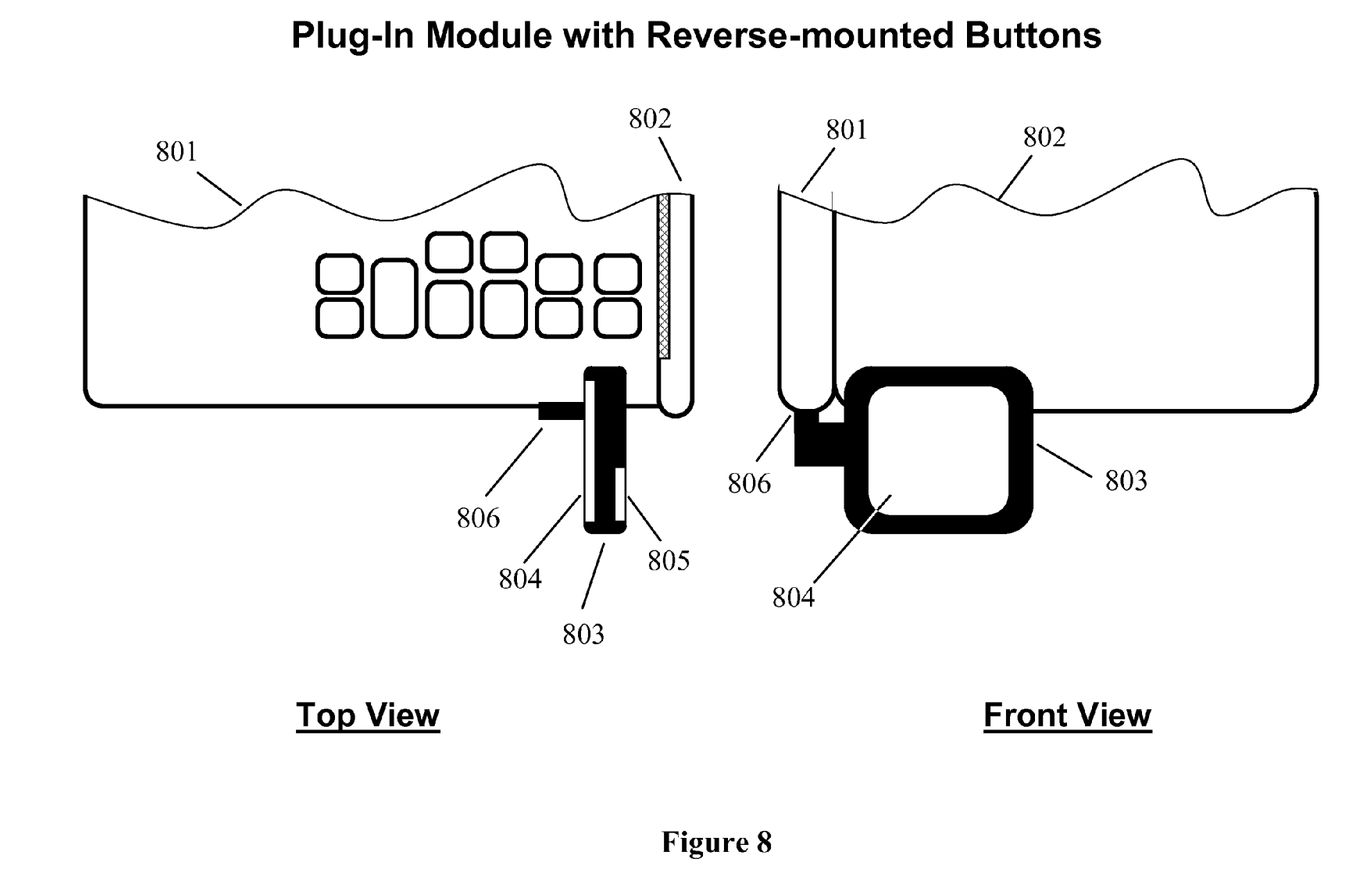
FIG. 8 shows a top view and front view of an assembly that mounts by plugging into a connector on a laptop computer. Here, the touchpad is mounted on the side of the assembly facing toward the user while the associated buttons are mounted on the side facing away from the user.

FIG. 8 shows a portion of the base unit 801 of a typical laptop computer and display panel 802 of the laptop computer, where a separate cursor control assembly 803 has been attached to base unit 801 of the laptop computer. Assembly 803 contains touchpad 804 facing in a direction toward the user and associated buttons 805 facing away from the user. Assembly 803 mounts directly to port 806 on base 801 of the laptop computer which may also supply power to assembly 803. Assembly 803 may be designed such that at least a portion of touchpad 804 extends to the right of the outside edge of base unit 801. If port 806 is a communications port such as USB, assembly 803 may receive power from port 806 and also communicate with the laptop computer via port 806. In this configuration, touchpad 804 would typically be operated with the user's thumb and associated buttons 805 would typically be operated with one or more of the user's fingers, not including their thumb. Assembly 803 may also communicate with the laptop computer by way of a wireless interface such as Bluetooth. Power for assembly 803 may alternately be supplied by a battery internal to the assembly.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts, while remaining within the scope of the appended claims. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. An assembly configured for temporarily attaching to a display panel of a conventional folding clamshell style portable computer having a base unit with keyboard and a separate display panel hinged to the base unit, the assembly including a touchpad and associated buttons, comprising:
   a touchpad mounted on a first outer surface of the assembly;
   one or more buttons mounted on a second outer surface of the assembly;
   wherein said first and second outer surfaces face in substantially opposite directions;
   wherein the display panel of the conventional folding clamshell style portable computer has no special provision for attachment of the assembly including the touchpad and associated buttons;
   wherein the assembly is designed to clip onto a side edge of the display panel of the portable computer;
   wherein the assembly including the touchpad and associated buttons has a generally J-shaped configuration;
   wherein when attached to the side edge of the display panel of the portable computer, a portion of the assembly is located behind the display panel; and
   wherein the portion of the assembly located behind the display panel is larger than a portion of the assembly located in front of the display panel.

2. The assembly of claim 1 wherein the one or more buttons face a user and are most readily operated with the user's thumb.

3. The assembly of claim 1 wherein the touchpad faces in a direction substantially away from a user and is most readily operated with a finger of the user, not including the user's thumb.

4. An assembly configured for temporarily attaching to a display panel of a conventional folding clamshell style portable computer having a base unit with keyboard and a separate display panel hinged to the base unit, the assembly including a touchpad and associated buttons, comprising:
   a touchpad mounted on a first outer surface of the assembly;
   one or more buttons mounted on a second outer surface of the assembly;
   wherein said first and second outer surfaces face in substantially opposite directions;
   wherein the display panel of the conventional folding clamshell style portable computer has no special provision for attachment of the assembly including the touchpad and associated buttons;
   wherein the assembly including the touchpad and associated buttons has a generally J-shaped configuration including a first structure comprising the first outer surface and a second structure comprising the second outer surface, and also including a third structure connecting the first and second structures; and
   wherein when attached to the display panel of the conventional folding clamshell style portable computer, the first outer surface faces toward away from a user and the second outer surface faces away from toward the user; and
   wherein the first structure comprising the first outer surface is larger than the second structure comprising the second outer surface.

* * * * *